Aug. 6, 1946.    C. K. HITCHON ET AL    2,405,426
PRODUCTION OF ALUMINA
Filed June 29, 1943
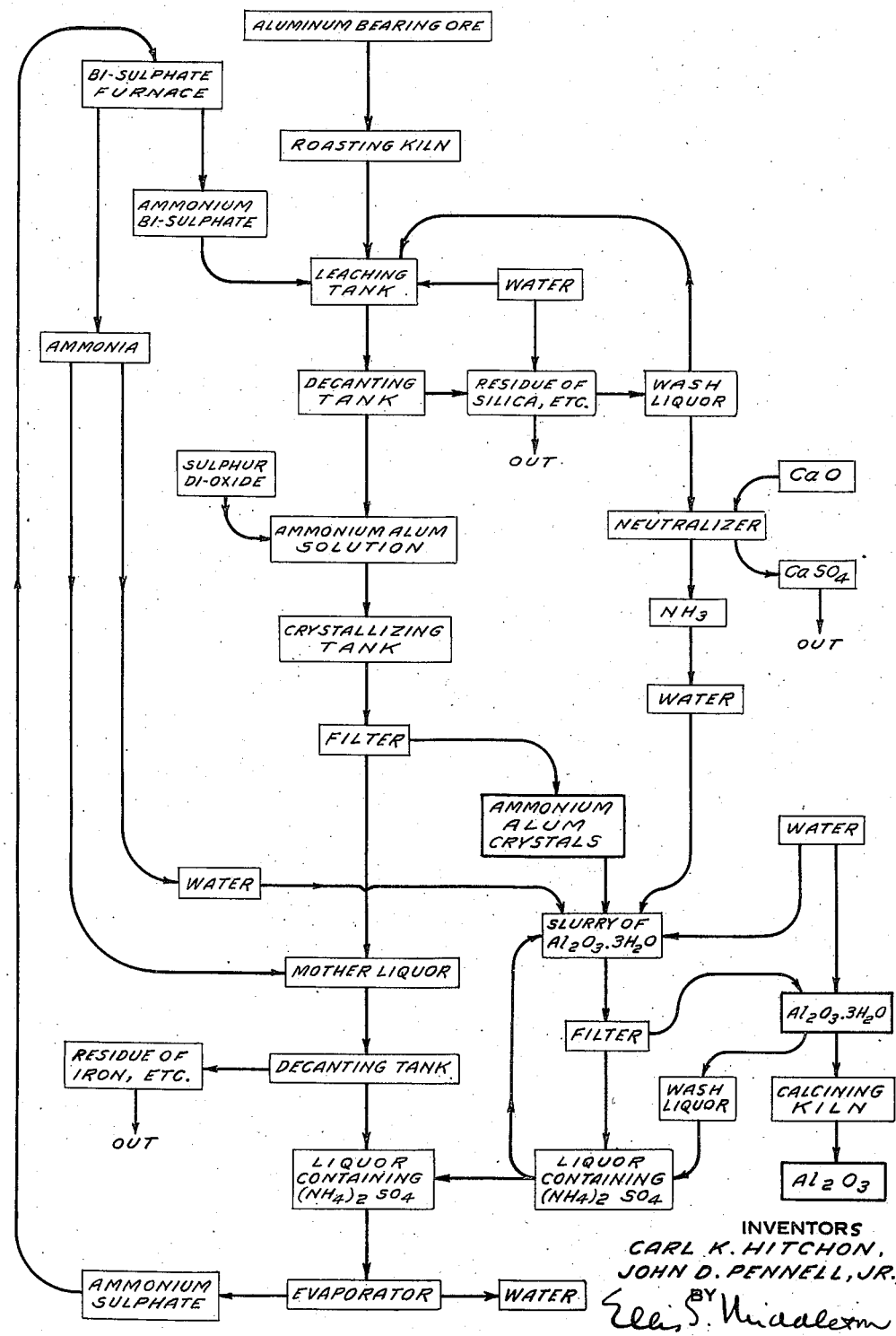
INVENTORS
CARL K. HITCHON,
JOHN D. PENNELL, JR.,
BY
ATTORNEY Patented Aug. 6, 1946

2,405,426

UNITED STATES PATENT OFFICE 2,405,426

PRODUCTION OF ALUMINA

Carl K. Hitchcn, Stamford, Conn., and John D. Pennell, Jr., New York, N. Y., assignors to Chemical Construction Corporation, New York, N. Y., a corporation of Delaware Application June 29, 1943, Serial No. 492,712

5 Claims. (Cl. 23—141)

The present invention relates to the production of alumina from aluminum-bearing ores.

The variety of materials, other than bauxite ores, which contain aluminum in one form or another, is very large. Aluminum being the third most abundant element in the earth's crust is present in almost all common rocks to some extent, and in a large number of minerals to a greater extent. Three important classes of aluminum-bearing minerals are feldspars, micas and clays. The aluminum content of these materials, calculated as $Al_2O_3$, varies from as low as 15% for some micas to as high as 63% for some complex aluminum silicates.

The chief process for making pure alumina for use in the aluminum industry is the Bayer. This process requires the use of the relatively scarce raw material known as bauxite. Furthermore, the bauxite must have a low content of siliceous impurities, since during the process alumina is dissolved from the crude raw material by means of caustic soda solutions which also attack silica. The silica in turn forms with sodium and alumina an insoluble ternary compound, sodium-aluminum silicate, which remains in the residue, causing prohibitive losses of alumina and soda. Hence, an alkali extraction process is virtually limited to the utilization of high grade bauxites.

The main difficulty in acid processes of extraction has been that iron in the aluminous raw materials dissolves coincidentally with the alumina, whether the reagents act in aqueous or in fused solutions. Removal of this iron impurity by any means consistent with economic operation has always been the greatest obstruction in the development or operation of acid extraction processes.

The principal object of this invention is the provision of an economical method of producing alumina in a substantially pure state. Another important object resides in a method for the production of alumina which permits the utilization of a wide variety of aluminum-bearing ores. A further object of the invention is to provide an improved method of recovering aluminum in the form of alumina from aluminum-bearing ores whereby the limitations attendant to former methods are obviated. Other objects will be apparent as the invention is more fully hereinafter disclosed.

It has been found that the above objects may be attained by establishing a cycle of operation which includes the steps of roasting an aluminum-bearing ore at a temperature sufficient to dehydrate the silica, leaching the roasted ore with hot aqueous ammonium bisulphate thus forming a slurry containing ammonium alum in solution, removing the insolubles, reducing any ferric iron in the hot aqueous solution to the ferrous state, cooling the solution to a temperature sufficient to crystallize the ammonium alum, removing the ammonium alum crystals and dissolving the same in hot water, treating the hot aqueous solution of ammonium alum with ammonia sufficient to precipitate the aluminum content as aluminum hydrate, removing the aluminum hydrate and calcining the same to alumina, treating the solution remaining after the removal of the ammonium alum crystals with ammonia sufficient to precipitate the iron content, removing the insolubles, uniting the remaining solution with the solution remaining after the removal of the aluminum hydrate and recovering the ammonium sulphate content, converting the ammonium sulphate to ammonium bisulphate and ammonia and returning both to the cycle.

Accordingly, the basic steps of the process involve preroasting the ore, solubilization of the aluminum by an ammonium bi-sulphate leach followed by precipitation of ammonium alum to eliminate impurities. Upon resolution of the ammonium alum, ammonia is added to precipitate aluminum hydrate. Calcination of this hydrate yields high quality alumina suitable for electro-metallurgical reduction to the metal. The bisulphate required in the leaching operation is obtained from a furnacing treatment of ammonium sulphate. The ammonia needed in the process is also produced in the furnacing operation. The ammonium sulphate is recovered from the mother liquors and serves as the feed to the bisulphate furnace.

A convenient method of carrying out the above cycle of operation is shown in diagrammatic form in the accompanying flow sheet. The operation thus indicated is as follows:

An aluminum-bearing ore, such as, for example, a clay or a low grade bauxite, is roasted at a temperature sufficient to dehydrate the silica and permit a more rapid rate of solubilization of the contained alumina in the subsequent digestion step. The preroasting temperature on numerous ores has been found to be rather flexible and no extreme degree of control is necessary. A temperature within the range of 600° to 900° C. may be used, although a temperature of from 700° to 800° C. is preferred.

The roasted ore is then crushed and ground to a relatively small particle size, say 40 mesh, and leached in a volume of hot aqueous ammonium bi-sulphate solution at least in the proportion of approximately six mols of ammonium bi-sulphate for each mol of the contained alumina. The hot slurry is maintained between 102° and 260° C. and preferably at between 110° to 140° C. with sufficient water to keep the thus formed ammonium alum in solution. This operation requires a period of several hours to reach completion, which permits recovery of at least 80% of the alumina as an iron-free ammonium alum.

It has been proposed to add the resulting slurry to an excess of a hot saturated solution of ammonium sulphate and then filter. On cooling the filtrate, ammonium alum of high purity is supposed to precipitate out while the iron salts remain in solution. However, such a procedure is extremely difficult to carry out as the ferric ammonium sulphate tends to crystallize out with the ammonium alum crystals, since both compounds crystallize in the same system.

When counter-current units are provided in the present process almost complete utilization of the bi-sulphate is possible. This means that not much excess bi-sulphate is needed in the cycle. Such needs, however, can be supplied by added quantities of bi-sulphate or by requisite amounts of $H_2SO_4$ added preferably in the digestion step. During this digestion other soluble components are, of course, likewise put into the solution. These will consist mainly of iron together with small amounts of titanium, potassium and sodium which will then be present as the respective sulphates. The suspended solids, consisting mainly of silica and titanium oxide, are removed from the hot solution, preferably by settling and decantation of the liquor. The insolubles may be washed with water and the wash liquor used in the digestion step of the following run. Substantially all of the titanium is removed in this step with the inert sands or waste mud, however, a small quantity, as already stated, passes into solution and is removed later in the cycle with the iron.

In washing the inert sands or waste mud to recover the soluble sulphate salts, the wash liquor resulting therefrom may be of such volume that only a portion is utilized in the digestion step of the subsequent run. In such instances, the excess wash liquor is treated with lime to recover the ammonia content, and the latter returned to the cycle.

The hot aqueous solution containing ammonium alum is then treated with sulfur dioxide or other appropriate reducing agent to convert any ferric iron to the ferrous state. This step is most important as it has been found that the iron must be in the reduced ferrous form in order to prevent contamination of the alum crystals therewith. If the iron were in the ferric form, the pure crystal would be more difficult to obtain because of the isomorphous nature of ferric sulphate and ferric ammonium sulphate in this system.

On cooling the solution, preferably to 20° C. or lower, and with good agitation, the iron-free ammonium alum crystallizes out while the iron salts remain in solution with the excess of ammonium sulphate.

The ammonium alum is removed by filtration, and either as such or after recrystallization is dissolved, for instance, in its water of crystallization by heating and maintaining the solution at a temperature of from 95° to 100° C. Aluminum hydrate is then precipitated by simultaneously adding the hot ammonium alum solution and ammonium hydroxide to a vessel containing water maintained at approximately its boiling point. In precipitating the aluminum hydrate in this manner, it is highly important to keep ahead with the ammonia feed so that the pH of the slurry is controlled within a definite range, said pH range being from 6.0 to 9.6, and preferably from 8.0 to 8.5 on samples withdrawn and cooled to 25° C. The aluminum hydrate, when precipitated under these conditions, is in a granular form which can be readily filtered and washed free of the ammonium sulphate. As the precipitation continues and the slurry becomes more concentrated, the temperature of the mixture rises to about 120° C., particularly toward the bottom of the vessel. The heavy slurry containing the aluminum hydrate, settling at the bottom of the precipitation vessel, is continuously withdrawn and filtered.

In maintaining the volume of liquid approximately constant in the precipitation vessel, a portion of the filtrate liquor from the aluminum hydrate may be returned, thus decreasing the quantity of water which otherwise would be added while at the same time avoiding added expense in evaporating the mother liquors to recover the ammonium sulphate.

The aluminum hydrate thus produced in the above precipitation step can be readily filtered so as to obtain a filter cake containing at least 40% $Al_2O_3$ which in turn does not place an undue evaporation load on the calcining step.

It has been proposed to produce the aluminum hydrate by heating the ammonium alum crystals with two or three times the theoretical quantity of ammonia in the form of a concentrated solution. Such a procedure will produce a slurry which can be readily filtered, however, the filter cake, at most, will not contain more than about 26% $Al_2O_3$. The present method, therefore, has a decided advantage thereover.

The aluminum hydrate is then washed with water to remove any adhering mother liquor containing ammonium sulphate, and calcined at the usual temperature to produce alumina in a state of very high purity.

The mother liquor remaining after removal of the ammonium alum crystals is treated with ammonia at room temperature while maintaining the pH of the slurry within the range of 8 to 8.5. The precipitated materials, mainly ferric hydroxide, are allowed to settle and the clear liquor containing ammonium sulphate decanted off. This clear liquor is united with the mother liquor remaining after the removal of the aluminum hydrate.

The ammonium sulphate mother liquors are evaporated to recover the ammonium sulphate crystals, the latter then being heated in a suitable furnace and thus converted to the ammonium bisulphate and ammonia which are returned to the cycle.

The bi-sulphate furnace used in the process is based on the principle of development of heat within the mass of material itself through the passage of an electric current. It is an electric resistance salt bath furnace and conversion of the sulphate to the bi-sulphate takes place together with evolution of ammonia gas approaching 100% in concentration and with decomposition of the order of only about one per cent. Problems of heat transfer are avoided because of the generation of the required heat within the material itself. Also, the troublesome feature of large gas volumes does not exist because of the relative purity of the ammonia as it leaves the furnace.

Therefore, by reclaiming the ammonium sulphate and converting the same to ammonium bi-sulphate and ammonia, an adequate supply of the reagents is thus provided in the cycle.

The method herein described is particularly advantageous in the treatment of aluminum-bearing ores containing high percentages of silica in contradistinction to the alumina processes now in common use.

While the invention has been described with particular reference to specific embodiments, it is to be understood that it is not to be limited thereto but is to be construed broadly and restricted solely by the scope of the appended claims.

We claim:

1. A method of producing alumina from aluminum-bearing earths containing iron which includes the following steps, digesting an aluminum-bearing earth with a hot aqueous solution containing at least six mols of ammonium bi-sulphate for each mol of aluminum in the earth calculated as alumina, removing the insolubles, reducing ferric iron to the ferrous state, crystallizing a substantially iron-free ammonium alum from the resultant liquor, dissolving the alum crystals in water, precipitating the aluminum hydrate therefrom in granular form with ammonia and calcining the aluminum hydrate to produce the alumina.

2. A method of producing alumina from aluminum-bearing earths containing iron which includes the following steps, digesting an aluminum-bearing earth with an aqueous solution containing at least six mols of ammonium bi-sulphate for each mol of aluminum in the earth calculated as alumina at from 102° to 260° C., removing the insolubles, reducing ferric iron to the ferrous state, crystallizing a substantially iron-free ammonium alum from the resulting liquor, dissolving the alum crystals in water, precipitating aluminum hydrate therefrom in granular form with ammonia and calcining the aluminum hydrate to produce alumina.

3. A method of producing alumina from aluminum-bearing earths containing iron which includes the following steps, digesting an aluminum-bearing earth with ammonium bi-sulphate, removing the insolubles, reducing ferric iron to the ferrous state, crystallizing a substantially iron-free ammonium alum from the resulting liquor, dissolving the alum crystals in water, adjusting the pH of the solution to between 6.0 and 9.6 and precipitating aluminum hydrate therefrom in granular form with ammonia while maintaining the pH of the solution between the above limits, and calcining the aluminum hydrate to produce alumina.

4. A method of producing alumina from aluminum-bearing earths containing iron which includes the following steps, digesting an aluminum-bearing earth with ammonium bi-sulphate, reducing ferric iron to the ferrous state, removing the insolubles, crystallizing a substantially iron-free ammonium alum from the resulting liquor, dissolving the alum crystals in water, adjusting the pH of the solution to between 8.0 and 8.5 and precipitating aluminum hydrate therefrom in granular form with ammonium hydroxide while maintaining the pH between the above limits, and calcining the aluminum hydrate to produce alumina.

5. A cyclic method of producing alumina from aluminum-bearing earths containing iron which includes the following steps, wet digesting an aluminum-bearing earth with ammonium bi-sulphate at from 102°–260° C., removing the insolubles, reducing the ferric iron to the ferrous state, crystallizing a substantially iron-free ammonium alum from the resulting liquor, dissolving the alum crystals in water, precipitating aluminum hydrate therefrom with ammonium hydroxide while maintaining the pH between 6.0 and 9.6, and calcining the aluminum hydrate to produce alumina, recovering solid ammonium sulphate from the liquor resulting from the aluminum hydrate precipitation step, heat converting the ammonium sulphate to ammonium bi-sulphate and ammonia and returning the bi-sulphate and ammonia to the cycle.

CARL K. HITCHON.
JOHN D. PENNELL, Jr.